1,931,026

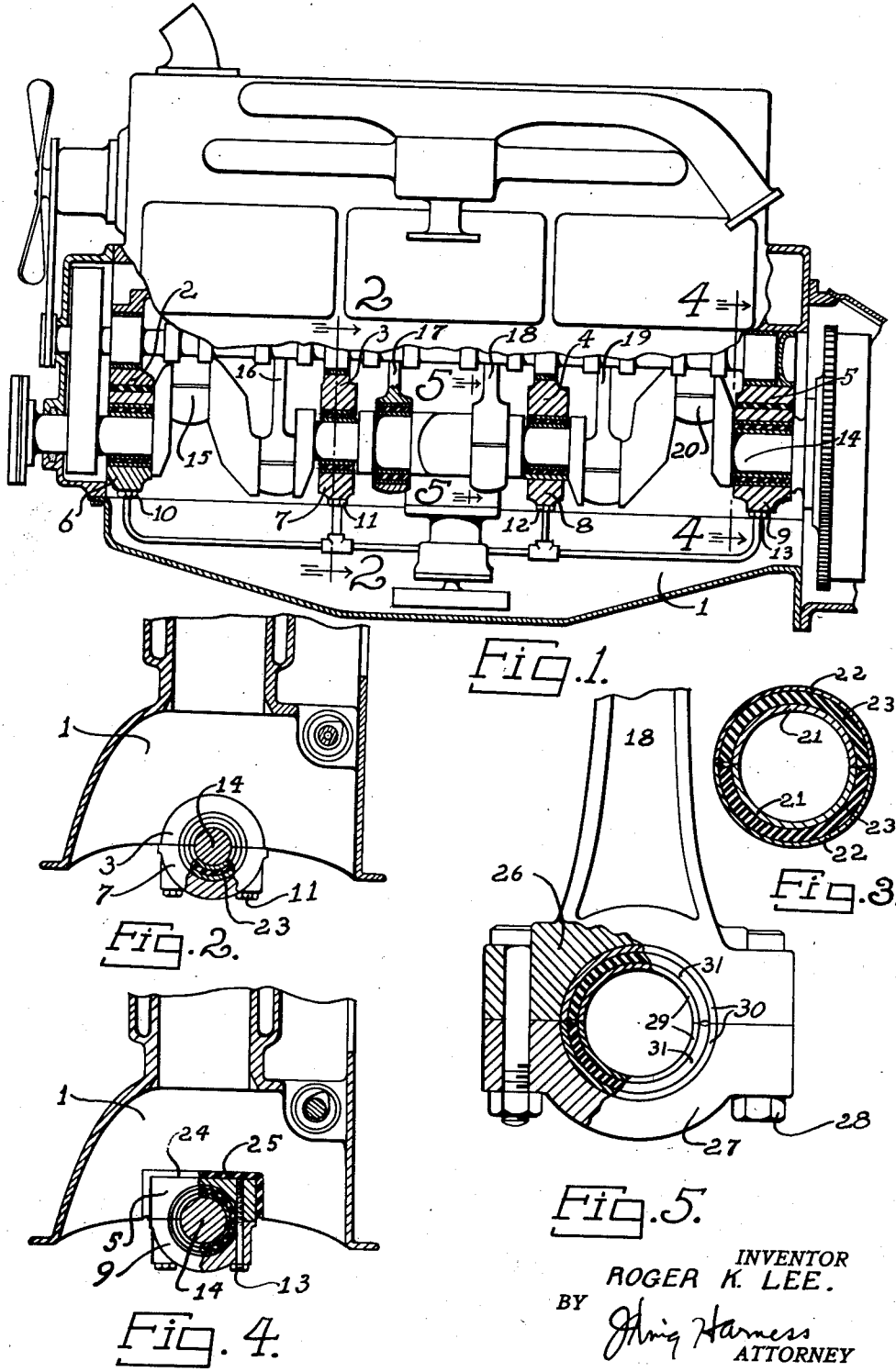
Oct. 17, 1933. R. K. LEE 1,931,026
BEARING
Filed March 26, 1930
INVENTOR
ROGER K. LEE.
BY
ATTORNEY Patented Oct. 17, 1933

UNITED STATES PATENT OFFICE 1,931,026

BEARING

Roger K. Lee, Highland Park, Mich., assignor to Chrysler Corporation, Detroit, Mich., a corporation of Delaware Application March 26, 1930. Serial No. 439,176

2 Claims. (Cl. 308—26)

This invention relates to improved bearing construction, particularly for crank shafts and connecting rods of internal combustion engines.

The main objects of this invention are to provide yieldable means in bearings of this kind for absorbing the impact to which crank shaft and connecting rod bearings are subjected so as to obviate engine knocks and prevent fatigue of the bearing metal; to provide rubber sleeves between the bearing members of the crank shaft and connecting rod bearings which are permanently bonded by vulcanization to the bearing material and to the structure in which it is supported; to provide divided, replaceable bearing units having rubber between the rigid parts thereof which may be shimmed and adjusted in substantially the same manner as bearings of conventional construction; and to provide improved means for yieldably supporting a main bearing block of an internal combustion engine on a crank case structure.

An illustrative embodiment of this invention is shown in the accompanying drawing, in which:

Fig. 1 is a side elevation, partly in section, of an internal combustion engine embodying my invention.

Fig. 2 is a vertical section taken on line 2—2 of Fig. 1.

Fig. 3 is an enlarged section of the yieldable bearing unit shown in Fig. 2.

Fig. 4 is a vertical section taken on line 4—4 of Fig. 1.

Fig. 5 is a side elevation, partly in section, of a connecting rod, taken on line 5—5 of Fig. 1.

In the form shown, the engine comprises a crank case 1 having main crank shaft bearings 2, 3, 4 and 5 on which bearing caps 6, 7, 8 and 9 are mounted by bolts 10, 11, 12 and 13 respectively. Journaled in the bearings 2, 3, 4 and 5 is a crank shaft 14 having connecting rods 15, 16, 17, 18, 19 and 20 on its crank arms.

The crank shaft bearing 3 shown in Fig. 2, is formed in an integral part of the crank case structure and it has a semi-cylindrical seat which registers with a similar complementary seat in the cap 7 which together form a cylindrical passage. Mounted in the bearing 3 and bearing cap 7 respectively, are yieldable bearing units each comprising complementary sleeve sectors 21 and 22 between which is located a yieldable member 23 preferably comprising rubber of a type which will resist the action of oil. The rubber member 23 is rigidly bonded by vulcanization to the adjacent sides of the sleeve sectors 21 and 22. A suitable bond between the metal and rubber parts is provided by forming a film or coating of brass on the metal parts before applying heat and pressure in the manner used in conventional vulcanizing processes. The upper and lower halves of the yieldable bearing units may be adjustably clamped on the journaled portion of the crank shaft 14 by the bolts 11 in the same manner as conventional crank shaft bearings are adjusted.

In Fig. 4, the crank shaft bearing 5 consists of a block, separate from the crank case structure 1, which is mounted in a recess 24 therein. Interposed between the adjacent sides of the bearing block 5 and recess 24 is a layer of rubber 25 which is rigidly bonded by vulcanization to the surfaces of the block and walls of the recess. The bearing block 5 and bearing cap 9 have registering complementary seats which form a cylindrical passage in which a yieldable bearing unit of the type described in connection with Fig. 2 is mounted.

All of the main crank shaft bearing may be of the type shown in either Fig. 2 or Fig. 4 and if desired one form may be used at one position in the crank case and the other form in another position as shown in Fig. 1. The layer of rubber 25 is somewhat yieldable and therefore provides a cushioning action which absorbs shock and vibration and helps to obviate engine noises.

Each connecting rod has a bearing part 26 at its lower end on which a connecting rod bearing cap 27 is mounted by bolts 28. The bearing part and cap of the connecting rod have registering complementary seats that form a substantially cylindrical opening in which is mounted a yieldable bearing unit comprising inner semi-cylindrical sleeve sectors 29 formed of bearing material, outer metal sleeve sectors 30 and intermediate rubber connecting member 31. The inner bearing sleeve sectors 29 receive the crank pin of the crank shaft 14 and are adjustably clamped thereon by the bolts 28. Shims may be used between the adjacent sides of the bearing part 26 and bearing cap 27 if desired, for reducing the grip of the bearing sleeves 29 upon the crank pins of the shaft.

The rubber members of the yieldable bearing unit have sound insulating properties and are adapted to absorb the impact to which the main bearings and the connecting rod bearings are subjected during operation of the engine. This construction obviates engine noises which heretofore have not been avoidable. The bearing units may be removed from their supports and replaced in the same manner as bearing sleeves of conventional construction.

The terms bond and bonded appearing herein and in the appended claims are used generically to designate unions formed between the rubber members and their associated parts in any suitable manner, as for example, by vulcanizing, cementing or compressing the rubber member in place so as to secure it against rotation.

Although but one specific embodiment of my invention has herein been shown and described, it will be understood that various changes including the size, shape and arrangement of parts may be made without departing from the spirit of my invention and it is not my intention to limit its scope other than by the terms of the appended claims.

I claim:

1. In combination, a substantially horizontal rotatable element, a rigid support having a recess therein provided with an open lower side, a bearing disposed in said recess rotatably supporting said element, and yieldable means having sound insulating properties rigidly bonded to said bearing and to the top and side walls of said recess, portions of said yieldable means acting in tension and shear respectively in supporting said shaft and bearing and the bonds between the yieldable material, support and bearing providing the only deterrent to separation of said bearing from said rigid structure.

2. In combination, a substantially horizontal rotatable element, a rigid support having a recess therein provided with an open lower side, a rubber pad having sound insulating properties rigidly secured to the top and side walls of said recess, and a bearing rotatably supporting said element, said bearing being rigidly bonded to said rubber pad and independently suspended thereby from said support.

ROGER K. LEE.